US008230770B1

(12) United States Patent
Renn (10) Patent No.: US 8,230,770 B1
(45) Date of Patent: Jul. 31, 2012

(54) APPARATUS TO ENERGETICALLY REMOVE A BALLISTIC TOLERANT WINDOW

(75) Inventor: Philip Alan Renn, La Plata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 542 days.

(21) Appl. No.: 12/587,318

(22) Filed: Sep. 22, 2009

(51) Int. Cl.
B64C 1/32 (2006.01)
B64D 1/04 (2006.01)

(52) U.S. Cl. .................................. 89/1.14; 244/122 AF (58) Field of Classification Search ................... 89/1.14; 244/122 AF
See application file for complete search history.

(56) References Cited

U.S. PATENT DOCUMENTS

| | | | |
|---|---|---|---|
| 3,486,410 A * | 12/1969 | Lake et al. | 89/1.14 |
| 3,633,456 A * | 1/1972 | Carr et al. | 89/1.14 |
| 3,729,154 A * | 4/1973 | Deplante | 244/122 AF |
| 3,778,010 A * | 12/1973 | Potts et al. | 244/121 |
| 4,275,858 A * | 6/1981 | Bolton et al. | 244/121 |
| 4,301,707 A * | 11/1981 | Schimmel et al. | 89/1.14 |
| 4,333,381 A * | 6/1982 | Boeglin et al. | 89/1.14 |
| 4,512,538 A * | 4/1985 | Devienne | 244/122 AF |
| 4,570,879 A * | 2/1986 | Dupin | 244/122 AF |
| 4,699,066 A * | 10/1987 | Eriksson | 102/305 |
| 4,879,941 A * | 11/1989 | Repe et al. | 89/1.14 |
| 4,978,089 A * | 12/1990 | Alquier et al. | 244/129.5 |
| 5,585,596 A | 12/1996 | Richards et al. | |
| 5,954,296 A * | 9/1999 | Jahsman et al. | 244/121 |
| 5,969,287 A * | 10/1999 | Blain et al. | 102/378 |
| 5,983,802 A | 11/1999 | Blain et al. | |
| 6,250,227 B1 * | 6/2001 | Salort | 102/378 |
| 6,286,430 B1 * | 9/2001 | Salort | 102/378 |
| 7,086,629 B2 | 8/2006 | Hilden et al. | |
| 7,367,738 B2 * | 5/2008 | Cleveland | 403/31 |
| 8,061,656 B1 * | 11/2011 | Renn et al. | 244/122 AF |
| 2003/0196544 A1 * | 10/2003 | Comtesse | 89/1.14 |

OTHER PUBLICATIONS

U.S. Appl. No. 12/587,316, filed Sep. 22, 2009, Renn.
Bell Helicopter, "Potential Egde Design"—Document provided in disclosure by inventor: Philip Allan Renn, Sep. 9, 2008.
Canopy and Hatch Explosive Charge, http://www.tpub.com/content/aviation/14020/css/14020_67.htm.
Product Data Sheet for Gillfab 1000 Laminate, http://www.mcgillcorp.com/products/datasheets/Gillfab_1000.pdf.

* cited by examiner

Primary Examiner — Bret Hayes
(74) Attorney, Agent, or Firm — Fredric J. Zimmerman (57) ABSTRACT

An apparatus to remove, energetically, a ballistic tolerant window. The elements include a ballistic tolerant fillet, which extends from the periphery of the ballistic tolerant window. Proximate to a perimeter of the fillet is a plurality of apertures that match up with holes on a tubular frame. The frame and fillet are joined using fastening elements, which are fitted in the holes and apertures. The tubular frame is a polygonal tube having sides useful for mounting the frame to an airframe and for mounting an expanding energetic element with a detonating cord. The energetic element is mounted on the frame adjacent to the fastening elements. When the energetic element is detonated, the explosive force is sufficient to cause the window to separate, energetically, from the tubular frame.

20 Claims, 7 Drawing Sheets

APPARATUS TO ENERGETICALLY REMOVE A BALLISTIC TOLERANT WINDOW

STATEMENT OF GOVERNMENT INTEREST

The invention described herein may be manufactured and used by or for the Government of the United States of America for Governmental purposes without the payment of any royalties thereon or therefore.

FIELD OF THE INVENTION

The invention relates generally to an emergency egress system for aircraft windows, and more particularly to an apparatus to energetically remove a ballistic tolerant window.

BACKGROUND OF THE INVENTION

The performance and survivability of personnel in an aircraft, such as a helicopter, is a major design consideration. While protection of the pilots and other crew members is of primary importance, consideration must also be given to other personnel (e.g., assault troops and litter patients) and mechanical components (e.g., fuel cells) whose survival contributes to successful mission performance. Personnel are susceptible to all direct and secondary injury mechanisms (e.g., spall fragments and other debris) emanating from threat weapon effects, as well as from other causes including explosive removal of windows/canopies and ejection seat rockets. The separation of windows/canopies and ejection seats is particularly dangerous as separation utilizes explosives in very close proximity to the crew and other personnel on the aircraft. The separation explosive can produce explosive decompression, sound pressure and impulse, toxic fumes, and smoke, all of which can have an adverse impact on the survivability of the crew and others.

Survivability and effectiveness is of special concern in the case of helicopters such as the AH-1W and AH-1Z USMC helicopters, where a combination of factors aggravates the situation. The crew is located very close to the airframe and the helicopters have been outfitted to have improved ballistic resistance. To effect separation of canopies and fixed windows having ballistic resistance requires greater explosive force, and therefore coincident greater trauma to those onboard when these emergency egress systems are actuated.

SUMMARY OF THE INVENTION

In a variation of the invention, the invention is an apparatus to energetically remove a ballistic tolerant window. The elements include a ballistic tolerant fillet, which extends from the periphery of the ballistic tolerant window. Proximate to the perimeter of the fillet is a plurality of apertures or openings that match up with holes in a tubular frame. The frame and fillet are joined using fastening elements, which are fitted in the holes and apertures. The tubular frame may be a polygonal tube, having sides not just curved surfaces, and these sides are useful for mounting the frame to an airframe, and for mounting an energetic element that includes a detonating cord and a flattened tube, where the flattened tube in this application includes any elongate chamber which when pressurized expands, deforming to a higher volume. An example of an expanded flattened tube is one that has expanded to a more elliptical or round tube. Another example of the expanded flattened tube is one that was initially a substantially rectangular tube that expands to a more elliptical or round tube. Generally, the detonating cord is confined within the flattened tube. On ignition, high pressure gases generated by the energetic material (explosive) of the detonating cord are largely confined within the tube, where the flattened tube expands to accommodate the high pressure gases. Fragments, toxic fumes and smoke are confined.

In one aspect of the invention, the energetic element is mounted on the window's tubular frame adjacent to the fastening elements, and when the energetic element is detonated, the explosive force is sufficient to cause the window to separate, energetically, from the tubular frame.

There are several aspects of the invention that make it particularly well suited for USMC helicopters such as the AH-1W and AH-1Z. A first aspect is that the high pressure gases are largely confined in the energetic element, thereby reducing toxic fumes and smoke. The expansion reduces the sound pressure and impulse.

A second aspect is that the force is directed outward, away from the crew.

A third aspect is that the invention does not require that any ballistic tolerant component of the invention break in order for the window to separate from the tubular frame. The expansion caused by the explosive forces are directed at components of the ballistic tolerant window that are not protected by ballistic transparencies and the like. The expansion attacks the fastening elements and the frame of the window, which are more vulnerable than the window proper. This strategy enables the amount of charge to be appropriately lowered.

BRIEF DESCRIPTION OF THE DRAWINGS

The foregoing invention will become readily apparent by referring to the following detailed description and the appended drawings in which.

DETAILED DESCRIPTION OF THE EXEMPLARY EMBODIMENTS OF THE INVENTION

Figure 1A:
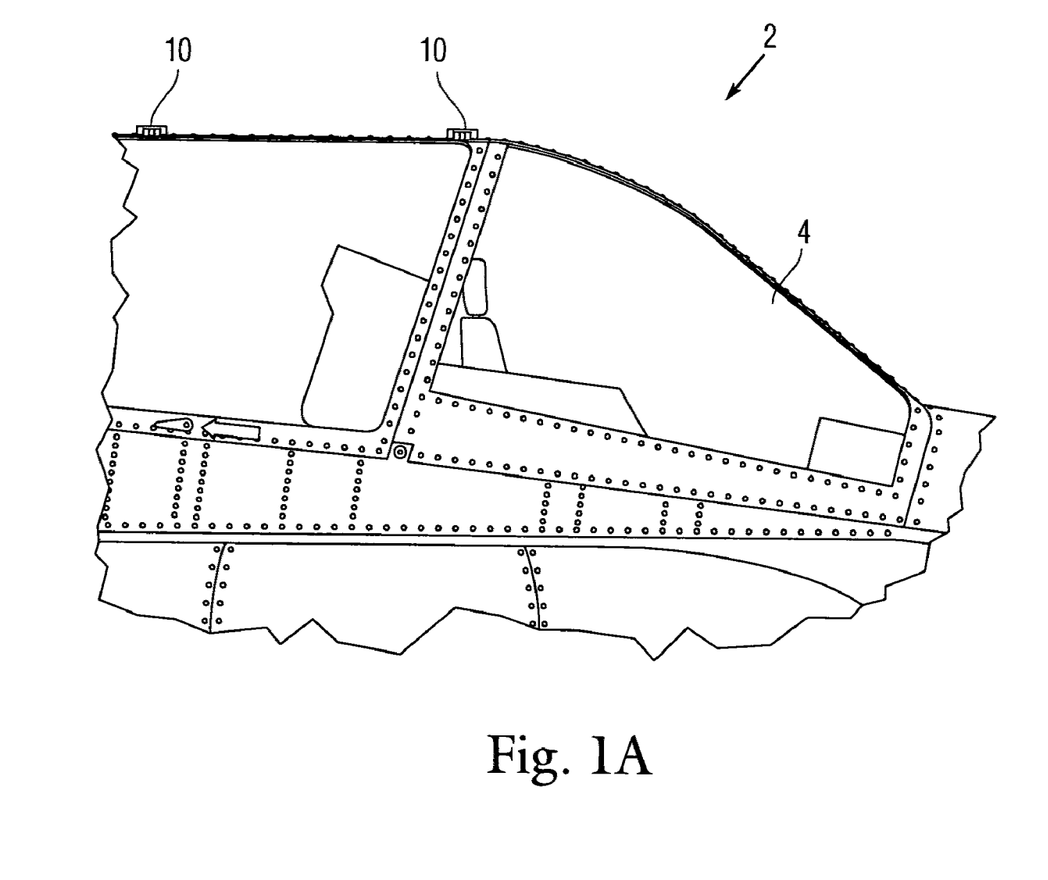
FIG. 1A is a perspective overview view of an exemplary embodiment of the invented apparatus from a right side of a helicopter.
Figure 1B:
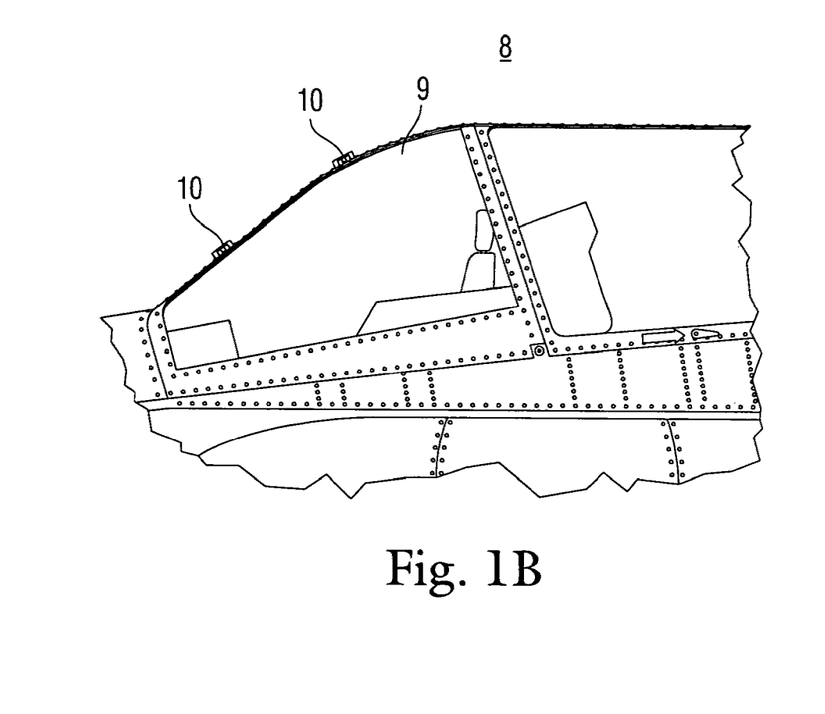
FIG. 1B is a perspective overview view of an exemplary embodiment of the invented apparatus from a left side of a helicopter.
Figure 1C:
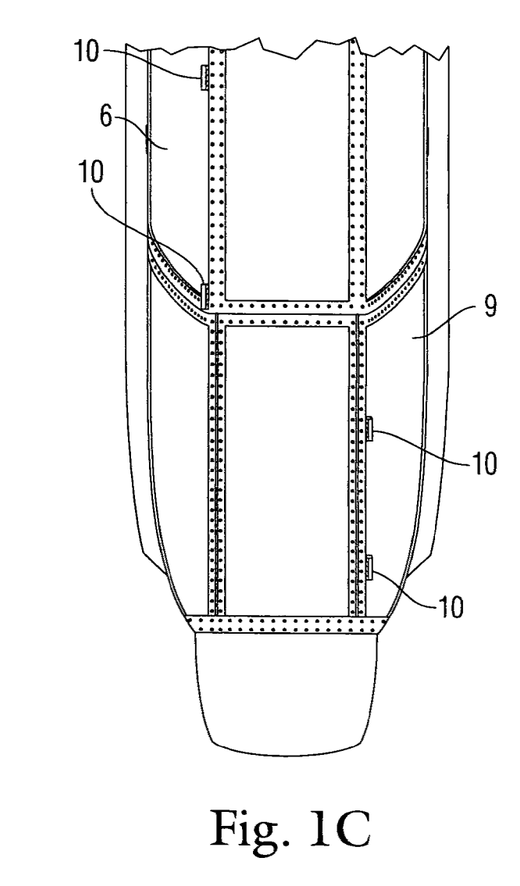
FIG. 1C is a perspective overview view of an exemplary embodiment of the invented apparatus from a top-down view of a helicopter.

An apparatus 10 to remove, energetically, a ballistic tolerant window. Several exemplary embodiments of the apparatus 10 are shown and described in the attached drawings. Referring to FIG. 1A and FIG. 1C, the apparatuses 10, 10 may be located on a right side 2 of a helicopter substantially adjacent a rear, right-side window 6, which is behind a front right-side window 4. Similarly, and referring to FIG. 1B, the apparatuses 10, 10 may be located on a left side 8 of a helicopter substantially adjacent a front, left-side window 9. Referring to FIG. 1C, the apparatuses 10, 10 may be located substantially adjacent the rear, right-side window 6 as well as located substantially adjacent the front, left-side window 9. Accordingly, the apparatuses 10, 10 on the right side of the helicopter 2 are off-set from the apparatuses 10, 10 on the left side of the helicopter 8 to permit efficient and safe exit from the helicopter 2.

Figure 2:
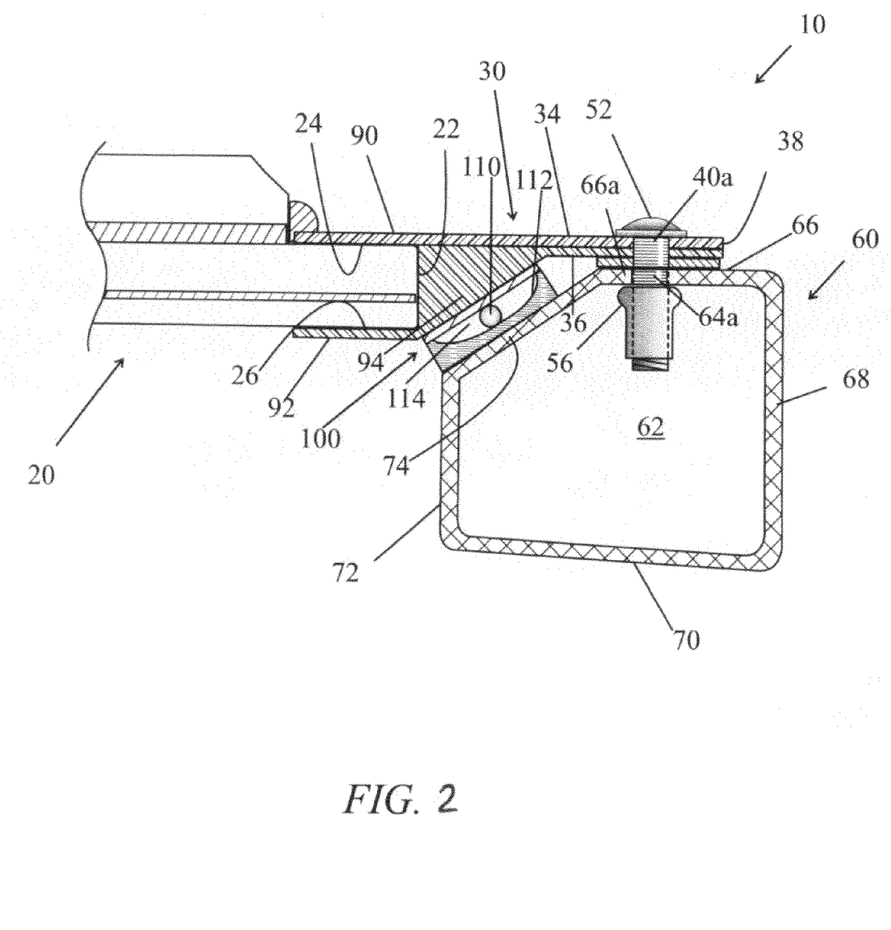
FIG. 2 is a cross-sectional side view of an exemplary embodiment of the invented apparatus to remove, energetically, a ballistic tolerant window, where an energetic element such as an expanding shielded mild detonating cord is adjacent to a plurality of a set of fastening elements and mounted to an angled side of the tubular frame.

Referring to FIG. 2, the apparatus 10 includes a ballistic tolerant fillet 30 extending substantially along the periphery 22 of the ballistic tolerant window 20. The fillet functions, in part, as a binding strip for mounting the window to a tubular frame 60, and also serves to provide additional protection to the crew and aircraft. The fillet includes a pre-cured laminate having a front-side sheet 34, a back-side sheet 36, and a perimeter 38 with a plurality of apertures proximate to the perimeter 38, where an aperture 40a can receive a first fastening element 52. The sheets may be bonded with an adhesive. An ballistic tolerant sheet is generally composed of a reinforced fiberglass cloth and a thermosetting acrylic resin. The front-side sheet 34 of the fillet 30 has a first overlapping portion 90 that is, in an exemplary embodiment, adhesively bonded to a front-side 24 of the ballistic tolerant window 20, and the back-side sheet 36 has a second overlapping portion 92 that is bonded to a back-side 26 of the ballistic tolerant window. In FIG. 2, the back-side sheet 36 has an angled medial portion 94. The front-side sheet 34 and the back-side sheet 36 are adhesively laminated out-board of the periphery of the window. The lamination triangulates the sheets with the window, and the triangulation and the reinforced fiberglass cloth produces a substantially rigid ballistic fillet.

The apparatus 10 includes a tubular frame 60 to which is mounted the ballistic tolerant fillet 30. The tubular frame 60 is substantially a polygonal tube 62 having a plurality of holes. The illustrated cross-section of the tube 62 has a first side 66 with a portion 66a, which nominally has a hole 64a for attaching a second fastening element 56 to the first fastening element 52, a second side 68 that provides structural strength to the tubular frame, a third side 70 that is substantially parallel to the first side 66 and provides structural strength, and a fourth side 72 that is substantially parallel to the second side 68 and provides structural strength.

The apparatus 10 includes a mounting assembly for fastening the tubular frame 60 to the ballistic tolerant fillet 30. The assembly includes a plurality of a set of fastening elements, where the plurality of the set of fastening elements connects the first side of the polygonal tube to the fillet. An example of a set of fastening elements are a screw 52 and an expanding threaded nut-like rivet 56. The plurality of the set includes all the fastening elements, such as screws 52 and nut-like rivets 56, used to attach the tubular frame to the fillet.

The apparatus includes an energetic element 100, for example an expanding shielded mild detonating cord, that extends substantially the perimeter of the fillet, where the expanding shielded energetic element 100 is adjacent to the plurality of the set of fastening elements and the tubular frame. In the illustrated version, the expanding shielded energetic element 100 is comprised of a detonating cord 110, a flattened tube 112 and a support material 114. The support material 114 is generally a rubbery material, for example, silicone rubber. The support material 114 provides some insulation against accidental detonation due to shock. When the expanding shielded energetic element 100 is detonated, the flatten tube 112 expands, generating forces on the tubular frame and the set of fastening elements. The forces are sufficient to cause the ballistic tolerant window 20 to separate, energetically, from the tubular frame 60.

Figure 3:
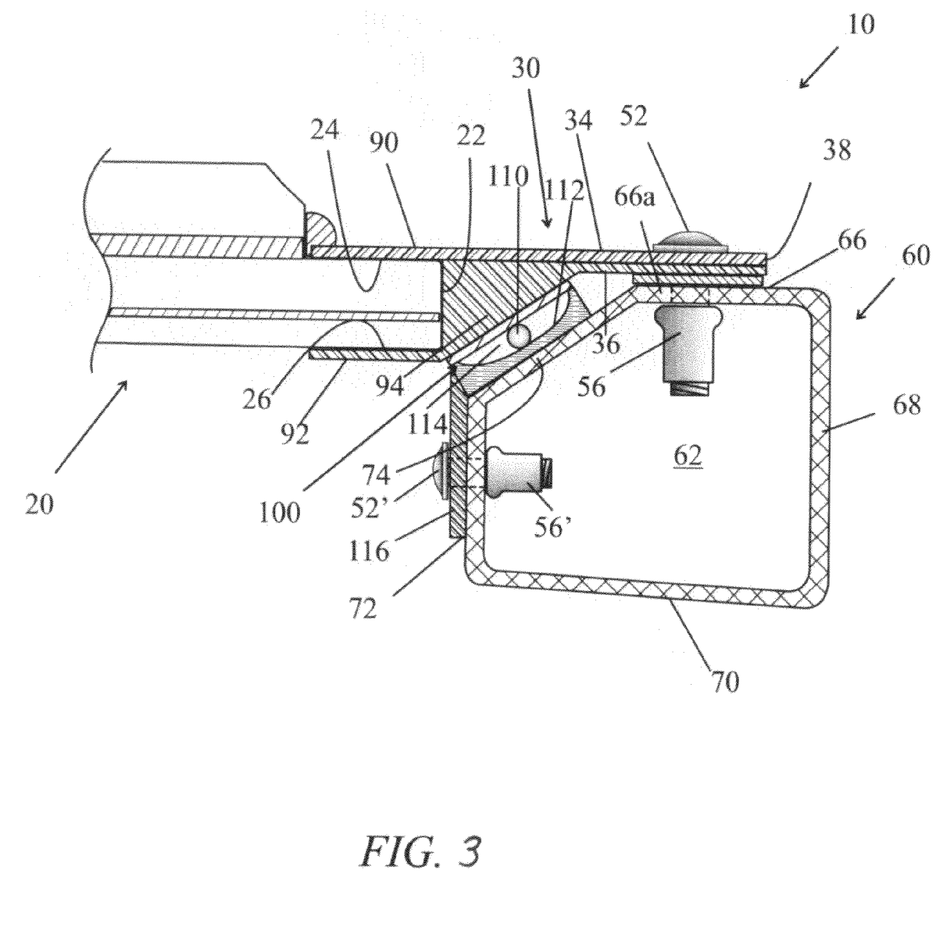
FIG. 3 is a cross-sectional side view of an alternate exemplary embodiment of the invention illustrated in FIG. 2, where the expanding shielded mild detonating cord is in a flattened tube in a charge holder that may be attached to a side of the tubular frame.

Referring to FIG. 3, the illustrated apparatus has a charge holder 116 that may be attached to a side of the tubular frame. In the illustrated version, the charge holder 116 contains the expanding shielded energetic element 100, and is attached to the fourth side with fastening elements consisting of a screw 52' and an expanding threaded nut-like rivet 56'. In both FIG. 2 and FIG. 3, the expanding shielded energetic element 100 is on a fifth side 74 of the polygonal tube 62, and angled such that when it detonates the fastening elements and tube will experience both tensile and shear forces. The expansion attacks the fastening elements and the frame of the window, which are more vulnerable than the window proper. This strategy enables the amount of charge to be appropriately lowered.

Generally, the charge material for the cord is selected from the group that includes RDX, PETN, TNT, HMX, PBXN-5, and HNS. RDX is cyclo-trimethylenetrinitramine; PETN is pentaerythritol tetranitrate; TNT is trinitrotoluene; HMX is cyclotetramethylenetetranitramine; PBXN-5 is composed substantially of cyclotetramethylenetetranitramine and a binder; and HNS is hexanitrostilbene. The tube material is selected from the group that includes 17-7 PH Steel, Haynes 25 Steel, Rene 41 Steel, A-286 Steel, 304 Stainless Steel, 304 N Stainless Steel, 347 Stainless Steel, 2024-T3, aluminum, and 2024-TO Aluminum. For marine environments HNS and stainless steel are generally selected. The expanding energetic element 100 having a mild detonating cord generally has a division 1.4 classification.

Figure 4:
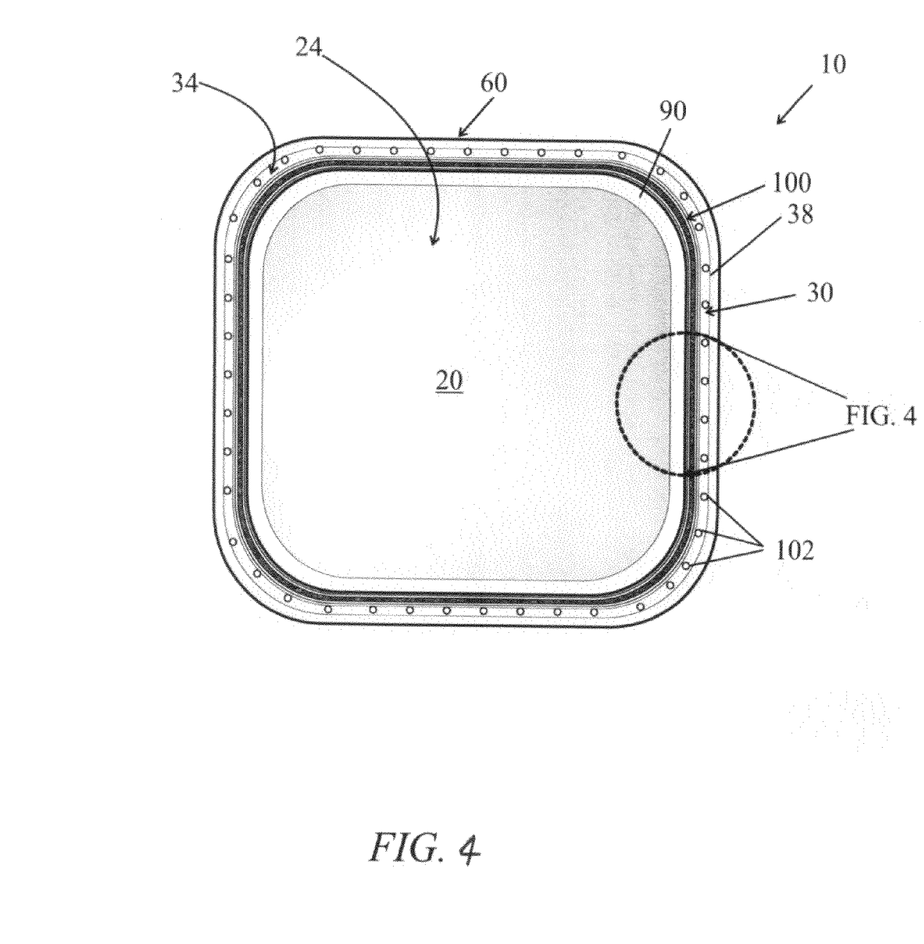
FIG. 4 is a frontal view of an exemplary embodiment of the ballistic window and the apparatus to separate, energetically, the window from the tubular frame.

Referring to FIG. 4, which is a frontal view of an embodiment of the ballistic window 20, the fillet 30 and the tubular frame 60. An inboard portion of the fillet 30 overlaps the front-side 24 of the ballistic tolerant window 20. The inboard portion has previously been identified as the first overlapping portion 90. The fillet extends around the periphery of the window, and is attached to the frame with a plurality of fastening elements 102. In an exemplary embodiment, only three fastening elements are specifically numbered, but as is evident there are many more. The fastening elements 102 are visible on the front-side 34 of the fillet, proximate to the perimeter 38. The expanding energetic element 100 runs the length of the perimeter, adjacent to and inboard to the fastening elements.

Figure 5:
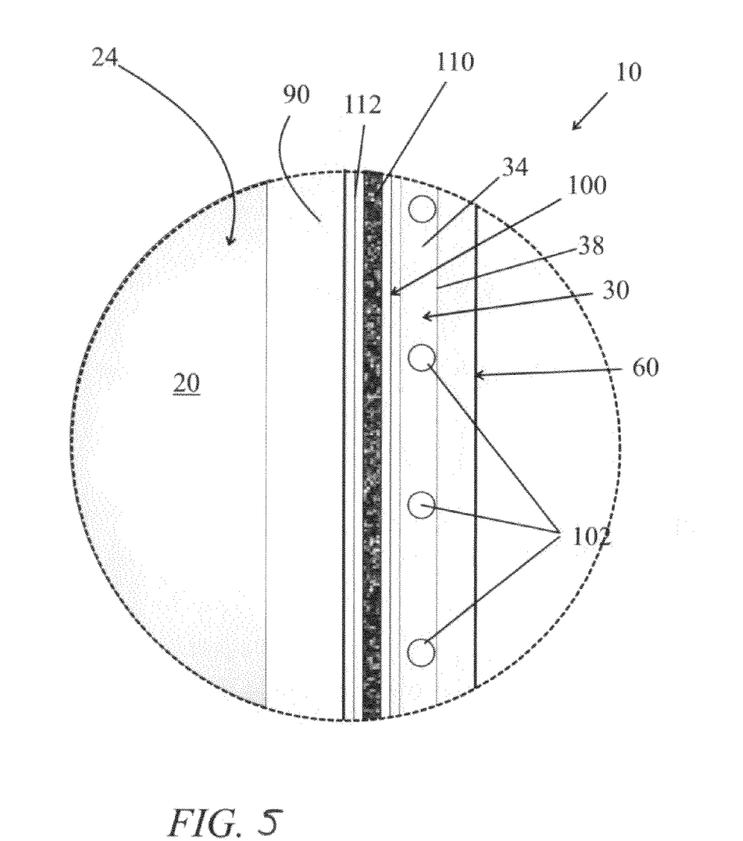
FIG. 5 is an enlarged frontal view of a portion of the exemplary embodiment illustrated in FIG. 4.

Referring to FIG. 5 is an enlarged frontal view of a portion of the exemplary embodiment illustrated in FIG. 4. Several of the fastening elements 102 are shown to be flush with and extending through the front-side sheet 34 of the laminated portion of the fillet. The flattened tube 112 and the detonating cord 110 of the energetic element 100 are illustrated somewhat diagrammatically to illustrate where they are relative to the fastening elements. The energetic element 100 is located proximate to the fastening elements, and outside of the window 20, on the back-side of the fillet and near or on the front side to the tubular frame. In this location, the expansion caused by the explosive forces are directed at components of the ballistic tolerant window that are not protected by ballistic transparencies and the like. The expansion attacks the fastening elements and the frame of the window, which are more vulnerable than the window proper. The location enables the amount of charge to be appropriately lowered, and the tubular frame and the tube of the energetic element shields the crew from the detonating cord 100.

Figure 6:
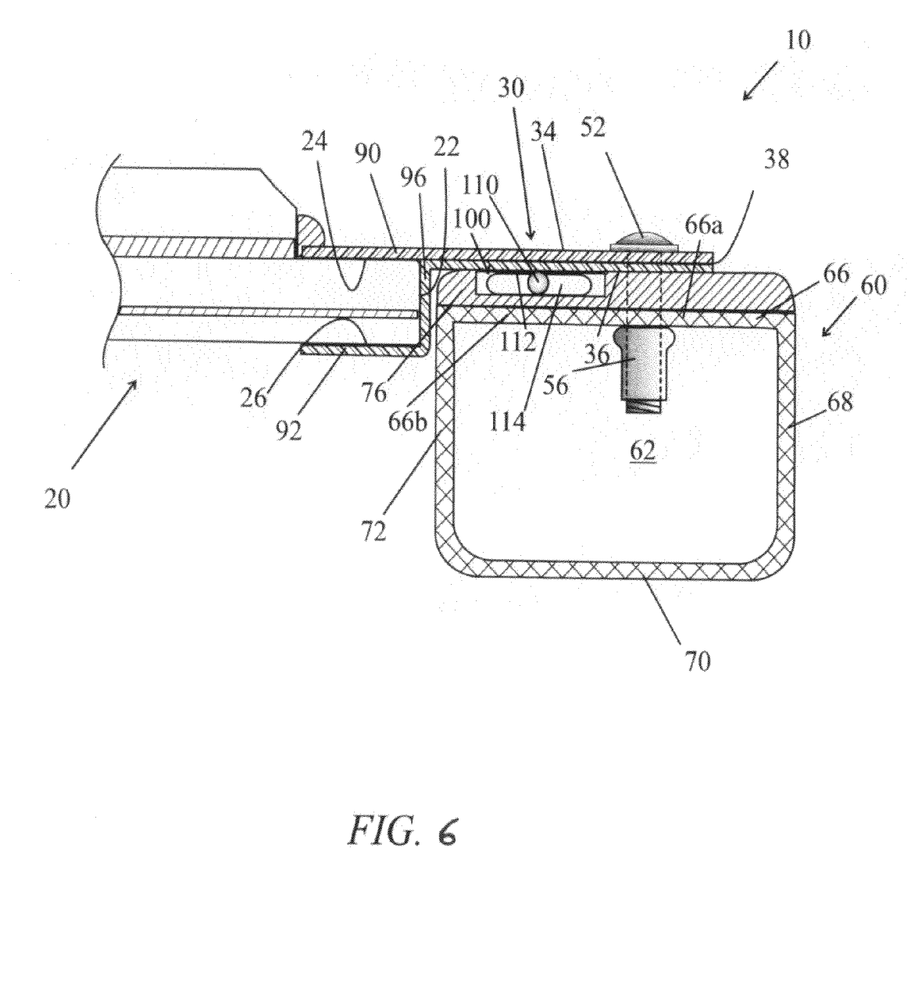
FIG. 6 is a cross-sectional side view of an alternate exemplary embodiment of the invented apparatus having a reinforcing cap, where the energetic element is supported by a rubbery material in a flattened tube, and the flattened tube is proximate to the fastening elements.

Referring to FIG. 6 is a cross-sectional side view of an alternate exemplary embodiment of the invented apparatus having a reinforcing cap 76. The expanding energetic element 100 has a detonating cord 110 that is supported by a rubbery material 114 in a flattened tube 112, and the flattened tube 112 is proximate to the fastening elements. The reinforcing cap 76 spans the first side 66 of the polygonal tube 62. The first side 66 has an inboard portion 66b and an outboard portion 66a. The reinforcing cap 76 above the inboard portion 66b contains the expanding energetic element 100, and the outboard portion 66a has an opening (not shown) that enables the fillet to be connected to the underlying first side 66 of the polygonal tube 62. As with the other exemplary embodiments, the expanding energetic element 100 is flush with the back-side sheet 36 of the pre-cured laminate. The back-side sheet 36 has a second overlapping portion 92 adhered to the backside 26 of the window 20, and an adjacent portion 96 that is that adhered to the periphery 22 of the window 20. The front-side sheet 34 of the fillet 30 has a first overlapping portion 90 that is adhesively bonded to a front-side 24 of the ballistic tolerant window 20. The reinforcing cap 76 adds an additional layer of protection for the crew. The reinforcing cap 76 may be fabricated out of a metal such as aluminum and the like, or an engineering plastic such as polyetheretherketone and the like, or a combination thereof.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

It is to be understood that the foregoing description and specific exemplary embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An apparatus for energetically removing a ballistic tolerant window, comprising:
    a ballistic tolerant fillet extending substantially along a periphery of the ballistic tolerant window, said fillet comprised of a pre-cured laminate includes a front-side, a back-side, and a perimeter with a plurality of apertures proximate to the perimeter, where an aperture receives a first fastening element;
    a tubular frame being mounted to the ballistic tolerant fillet, said tubular frame is comprised of a substantially polygonal tube, which includes a plurality of holes, said substantially polygonal tube includes, cross-sectionally, a first side with a portion, which nominally includes a hole for a second fastening element, a second side provides structural strength to the tubular frame, a third side is substantially parallel to the first side and provides structural strength, and a fourth side is substantially parallel to the second side and provides structural strength;
    a mounting assembly fastening the tubular frame to the ballistic tolerant fillet, said assembly comprises a set of fastening elements, where the set of fastening elements connects the first side of the polygonal tube to the fillet; and
    an expanding energetic element including a detonation cord for extending substantially the perimeter of the fillet, and being adjacent to the set of fastening elements and the tubular frame,
    wherein said detonation cord upon detonation expands the energetic element to generate forces on the tubular frame and the set of fastening elements, said forces are sufficient to cause the ballistic tolerant window to separate, energetically, from the tubular frame.

2. The apparatus according to claim 1, wherein said pre-cured laminate is comprised of at lest two ballistic tolerant sheets bonded together with an adhesive.

3. The apparatus according to claim 1, wherein said pre-cured laminate is composed of a reinforced fiberglass cloth and a thermosetting acrylic resin.

4. The apparatus according to claim 1, wherein said pre-cured laminate comprises a first ballistic tolerant sheet having a first overlapping portion bonded to a front-side of the ballistic tolerant window, and a second ballistic tolerant sheet having a second overlapping portion bonded to a back-side of the ballistic tolerant window.

5. The apparatus according to claim 4, wherein said first ballistic sheet and said second ballistic sheet extend beyond the periphery of the ballistic tolerant window, and the first ballistic sheet and the second ballistic sheet are adhesively laminated therein to form the ballistic fillet.

6. The apparatus according to claim 1, wherein said set of fastening elements comprises a screw in the aperture of the fillet and an expanding threaded nut-like rivet in the aligned hole, where the threaded nut-like rivet extends through the hole into an interior of the polygonal tube, said screw and threaded nut-like rivet threadedly join the ballistic fillet to the tubular frame.

7. An apparatus to energetically remove a ballistic tolerant window, comprising:
    a ballistic tolerant fillet extending substantially along a periphery of the ballistic tolerant window, said fillet comprised of a pre-cured laminate includes a front-side, a back-side, and a perimeter with a plurality of apertures proximate to the perimeter, where an aperture receives a first fastening element;
    a tubular frame being mounted to the ballistic tolerant fillet, said tubular frame is comprised of a substantially polygonal tube, which includes a plurality of holes, said substantially polygonal tube includes, cross-sectionally, a first side with a portion, which nominally includes a hole for mounting the fillet, a second side provides structural strength to the tubular frame, a third side is substantially parallel to the first side and provides structural strength, a fourth side is substantially parallel to the second side and provides structural strength, and a fifth side completes the substantially polygonal tube and is angled from the window toward the fillet perimeter;
    a mounting assembly fastening the tubular frame to the ballistic tolerant fillet, said assembly comprises a set of fastening elements, where the the set of fastening elements connects the first side of the polygonal tube to the fillet; and
    an energetic element comprising a detonation cord being supported by a rubbery material in a flattened tube on the fifth side, where said flattened tube and enclosed cord extend substantially lengthwise on the substantially polygonal tube inside of the perimeter of the fillet adjacent to a set of fastening elements, and angled toward the periphery of the ballistic tolerant window,
    wherein said detonation cord upon detonation expands the flattened tube to generate shear and tensile forces on the set of fastening elements, said forces are sufficient to cause the ballistic tolerant window to separate, energetically, from the tubular frame.

8. The apparatus according to claim 7, wherein said pre-cured laminate is comprised of at least two ballistic tolerant sheets bonded together with an adhesive.

9. The apparatus according to claim 7, wherein said pre-cured laminate is composed of a reinforced fiberglass cloth and a thermosetting acrylic resin.

10. The apparatus according to claim 7, wherein said pre-cured laminate comprises a first ballistic tolerant sheet having a first overlapping portion bonded to a front-side of the ballistic tolerant window, and a second ballistic tolerant sheet having a second overlapping portion bonded to a back-side of the ballistic tolerant window, and an angled medial portion bonded to the flattened tube.

11. The apparatus according to claim 10, wherein said first ballistic sheet and said second ballistic sheet extend beyond the periphery of the ballistic tolerant window, and the first ballistic sheet and the second ballistic sheet with the angled medial portion are adhesively laminated therein forming the fillet.

12. The apparatus according to claim 7, wherein said set of fastening elements comprises a screw in the aperture of the fillet and an expanding threaded nut-like rivet in the aligned hole, where the threaded nut-like rivet extends through the hole into an interior of the polygonal tube, said screw and threaded nut-like rivet threadedly joining the ballistic fillet to the tubular frame.

13. The apparatus according to claim 7, wherein said expanding shielded mild detonating cord enclosed in the flattened tube is an add-on structure available for at least one of addition and replacement during a life of the ballistic tolerant window.

14. An apparatus for energetically removing a ballistic tolerant window, comprising:
a ballistic tolerant fillet extending substantially along a periphery of the ballistic tolerant window, said fillet comprised of a pre-cured laminate includes a front-side, a back-side, and a perimeter with a plurality of apertures proximate to the perimeter, where an aperture receives a first fastening element;
a tubular frame being mounted to the ballistic tolerant fillet, said tubular frame is comprised of a substantially polygonal tube, which includes a plurality of holes, said tube includes, cross-sectionally, a first side with an inboard portion with a reinforcing cap that extends the length of the polygonal tube, and an outboard portion, which nominally has a hole for a second fastening element, a second side provides structural strength to the tubular frame, a third side is substantially parallel to the first side and provides structural strength, and a fourth side is substantially parallel to the second side and provides structural strength;
a mounting assembly fastening the tubular frame to the ballistic tolerant fillet, said assembly comprises a set of fastening elements, where the set of fastening elements connects the first side of the polygonal tube to the fillet; and
an energetic element comprising a detonating cord being supported by a rubbery material in a flattened tube in a top of a reinforcing cap on the first side,
wherein said flattened tube and enclosed cord are adjacent to the set of fastening elements and flush with the back-side of the ballistic fillet, and
wherein said detonating cord upon detonation expands the flattened tube to generate forces on the tubular frame and the set of fastening elements, said forces are sufficient to cause the ballistic tolerant window to separate, energetically, from the tubular frame.

15. The apparatus according to claim 14, wherein said set of fastening elements comprise a screw in the aperture of the fillet and an expanding threaded nut-like rivet in the aligned hole, where the threaded nut-like rivet extends through the hole into an interior of the polygonal tube, said screw and threaded nut-like rivet threadedly join the ballistic fillet to the tubular frame.

16. The apparatus according to claim 14, wherein said reinforcing cap is composed of aluminum.

17. The apparatus according to claim 14, wherein said reinforcing cap is composed of polyetheretherketone.

18. The apparatus according to claim 14, wherein said pre-cured laminate comprises a first ballistic tolerant sheet having a first overlapping portion bonded to a front-side of the ballistic tolerant window, and a second ballistic tolerant sheet having a second overlapping portion bonded to a back-side of the ballistic tolerant window.

19. The apparatus according to claim 18, wherein said first ballistic sheet and said second ballistic sheet extend beyond the periphery of the ballistic tolerant window, and the first ballistic sheet and the second ballistic sheet are adhesively laminated therein to form the ballistic fillet.

20. The apparatus according to claim 14, wherein the energetic element is classified as a division 1.4 classification.

* * * * *